United States Patent
Benbouhout

(10) Patent No.: US 11,444,390 B2
(45) Date of Patent: Sep. 13, 2022

(54) NEAR-FIELD COMMUNICATION AND ULTRA HIGH FREQUENCY DEVICE

(71) Applicants: Continental Automotive France, Toulouse (FR); Continental Automotive GmbH, Hannover (DE)

(72) Inventor: Rachid Benbouhout, Cugnaux (FR)

(73) Assignees: CONTINENTAL AUTOMOTIVE FRANCE, Toulouse (FR); CONTINENTAL AUTOMOTIVE GMBH, Hannover (FR)

( * ) Notice: Subject to any disclaimer, the term of this patent is extended or adjusted under 35 U.S.C. 154(b) by 164 days.

(21) Appl. No.: 16/957,175

(22) PCT Filed: Jan. 18, 2019

(86) PCT No.: PCT/FR2019/050110
§ 371 (c)(1),
(2) Date: Jun. 23, 2020

(87) PCT Pub. No.: WO2019/145625
PCT Pub. Date: Aug. 1, 2019

(65) Prior Publication Data
US 2020/0335883 A1 Oct. 22, 2020

(30) Foreign Application Priority Data
Jan. 29, 2018 (FR) ...................................... 1850674

(51) Int. Cl.
*H01Q 1/22* (2006.01)
*H01Q 1/38* (2006.01)
(Continued)

(52) U.S. Cl.
CPC .......... *H01Q 21/28* (2013.01); *H01Q 1/2291* (2013.01); *H01Q 1/38* (2013.01); *H01Q 7/00* (2013.01)

(58) Field of Classification Search
CPC ........ H01Q 21/28; H01Q 1/2291; H01Q 1/38; H01Q 7/00; H01Q 9/42; H01Q 1/12;
(Continued)

(56) References Cited

U.S. PATENT DOCUMENTS

2005/0007283 A1  1/2005  Jo et al.
2007/0077973 A1  4/2007  Wu et al.
(Continued)

FOREIGN PATENT DOCUMENTS

CN  102377012 A  3/2012
CN  104205491 A  12/2014
(Continued)

OTHER PUBLICATIONS

International Search Report and Written Opinion for International Application No. PCT/FR2019/050110, dated May 7, 2019, with partial translation, 11 pages.
(Continued)

*Primary Examiner* — Hai V Tran
*Assistant Examiner* — Michael M Bouizza
(74) *Attorney, Agent, or Firm* — RatnerPrestia

(57) ABSTRACT

A device for near-field and ultra-high-frequency communication, the device includes a near-field-communication antenna, an ultra-high-frequency antenna, a control unit including a controller for controlling the ultra-high-frequency antenna and a controller for controlling the near-field-communication antenna, a first carrier on which the NFC antenna is located, a second carrier on which the control unit is located, the first carrier and second carrier being located one above the other and connected by mechanical support pins, it is proposed that the ultra-high-frequency antenna be located on the first carrier and be connected to the control unit via: a first connection located on the first carrier, at least one pin made of conductive metal,
(Continued)

and a second connection located on the second carrier, so as to produce a bidirectional ultra-high-frequency antenna.

13 Claims, 3 Drawing Sheets

(51) Int. Cl.
*H01Q 21/28* (2006.01)
*H01Q 7/00* (2006.01)

(58) Field of Classification Search
CPC ........ H02J 7/0044; H02J 50/005; H02J 50/10; H04B 5/0037; H04B 5/0031; H04B 5/0081

See application file for complete search history.

(56) References Cited

U.S. PATENT DOCUMENTS

| | | | |
|---|---|---|---|
| 2008/0081631 A1 | 4/2008 | Rofougaran | |
| 2012/0032858 A1 | 2/2012 | Chang | |
| 2012/0235690 A1 | 9/2012 | Potyrallo et al. | |
| 2013/0225070 A1 | 8/2013 | Lin | |
| 2014/0035793 A1* | 2/2014 | Kato | H01Q 7/06 343/867 |
| 2015/0044983 A1 | 2/2015 | Konanur et al. | |
| 2015/0249485 A1 | 9/2015 | Ouyang et al. | |
| 2016/0056664 A1* | 2/2016 | Partovi | B60L 53/122 307/104 |
| 2016/0248468 A1 | 8/2016 | Greiner et al. | |
| 2017/0170875 A1 | 6/2017 | Cheikh et al. | |
| 2017/0201008 A1 | 7/2017 | Wu | |
| 2019/0140699 A1 | 5/2019 | Park et al. | |
| 2020/0336174 A1* | 10/2020 | Cheikh | H01Q 1/243 |

FOREIGN PATENT DOCUMENTS

| | | |
|---|---|---|
| CN | 204333283 U | 5/2015 |
| CN | 204596946 U | 8/2015 |
| CN | 105375106 A | 3/2016 |
| CN | 205451141 U | 8/2016 |
| CN | 105940554 A | 9/2016 |
| CN | 106537687 A | 3/2017 |
| EP | 2421089 A2 | 2/2012 |
| EP | 3203581 A1 | 8/2017 |
| WO | 2013115147 A1 | 8/2013 |
| WO | 2017117945 A1 | 7/2017 |
| WO | 2017188628 A1 | 11/2017 |

OTHER PUBLICATIONS

International Search Report and Written Opinion for International Application No. PCT/FR2019/050110, dated May 7, 2019, 15 pages (French).

Cheng, H. et al., "UHF Near-Field Radio Frequency Identification Reader Antenna Based on Segmented Electric Large-Size Dipole", Aug. 5, 2017, 12 pages, Nanjing University of Science and Technology, Nanjing, 210094 (with English translation).

Chinese Office Action for Chinese Application No. 201980010428. 5, dated Apr. 1, 2021, with translation, 14 pages.

* cited by examiner

NEAR-FIELD COMMUNICATION AND ULTRA HIGH FREQUENCY DEVICE

CROSS REFERENCE TO RELATED APPLICATIONS

This application is the U.S. National Phase Application of PCT International Application No. PCT/FR2019/050110, filed Jan. 18, 2019, which claims priority to French Patent Application No. 1850674, filed Jan. 29, 2018, the contents of such applications being incorporated by reference herein.

FIELD OF THE INVENTION

The invention relates to a device for near-field and ultra-high-frequency communication with a portable user apparatus.

More particularly, but not exclusively, the invention applies to inductive chargers for portable devices, for installation in a motor vehicle and including a near-field-communication device in order to communicate with a portable apparatus once said apparatus has been placed on the receiving surface of the inductive charger, and also including an ultra-high-frequency, i.e. far-field, communication device, for example a Bluetooth® or BLE® ("Bluetooth Low Energy") device, in order to communicate with the portable apparatus even when it is located outside the vehicle.

BACKGROUND OF THE INVENTION

What is understood by near-field communication is a communication at a frequency of around 13.56 MHz. What is understood by far-field communication is a communication at a frequency of around 2.4 GHz for BLE®, or between 2.4 GHz and 5 GHz for Wi-Fi®.

The inductive charger in the latter case, when it is equipped with means for far-field communication, such as BLE®, may then function as a transceiver for a "hands-free" system for access to the vehicle and authorize access to the vehicle and/or startup of the vehicle for any user carrying/wearing the portable apparatus, smartphone or badge, previously authenticated by the vehicle, with them.

Magnetic-coupling charging devices allowing wireless charging of portable apparatuses (cellphones, laptops, touchscreen tablets, digital cameras, etc.) are currently experiencing significant growth.

Conventionally, a magnetic-coupling charging device includes a conductor coil, referred to as the "primary antenna", which is connected to a charging module. During charging of a mobile apparatus, the charging module forms a charging signal that makes it possible to channel an electric current, the intensity of which varies over time, through the primary antenna. The primary antenna that is thus supplied forms a variable magnetic field.

The portable apparatus includes a receiver module including a conductor coil, referred to as the "secondary antenna". When said secondary antenna is placed within the variable magnetic field formed by the primary antenna, an electric current is induced in said secondary antenna. This electric current makes it possible to charge an electrical storage battery connected to the secondary antenna, thus supplying current to the portable apparatus.

It is known practice to place one's portable apparatus on a charging device so as to charge the portable apparatus through induction, and so that it communicates at the same time as or after the charging period by near-field communication (NFC) with the electronic system on board the vehicle. This short-distance wireless communication (generally about a few millimeters) makes it possible, among other things, for the vehicle to download a particular user profile contained in the portable apparatus and thus to adjust elements of the vehicle according to this profile, for example to adjust the position of the driver seat in the vehicle, to program favorite radio stations, to modify the appearance of the instrument panel or to activate the "E-call" (emergency-call) function, etc.

To this end and as is known, these charging devices comprise a dedicated radiofrequency antenna for inductive charging, referred to as the charging antenna, which is a WPC (Wireless Power Consortium) antenna, i.e. a wireless inductive charging antenna in accordance with the standards of this consortium, allowing inductive charging at frequencies ranging from 100 to 200 kHz, as well as another antenna of higher frequency, generally around 13.56 MHz, that is dedicated to this near-field communication. It may also be any other radiofrequency antenna allowing communication by short-distance coupling between the portable apparatus and the charging device that is connected to the electronic system on board the vehicle.

As is known, the primary WPC charging antenna is centered in the middle of the charging device in order to be aligned with respect to the secondary antenna of the portable apparatus, which is itself also generally located in the center of said apparatus. The NFC antenna is generally arranged around the WPC antenna all the way around the periphery of the charging device. Similarly, the NFC antenna of the portable apparatus is also located around the periphery of the back face of the portable apparatus and is therefore located facing the NFC antenna of the charging device when the portable apparatus is placed on the charging device, which allows effective NFC communication.

In this charging device equipped with a WPC charging antenna and an NFC communication antenna, the integration of an additional antenna, in this case an ultra-high-frequency (UHF) antenna, for example a BLE antenna, presents several problems. In this case, the problem is one of positioning the BLE antenna, since the space allocated in the charging device is generally limited.

It is therefore preferable to arrange the three antennas on two different carriers in the charging device, the two said carriers preferably being located facing one another.

This is illustrated in FIG. 1.

On a first carrier, which is a printed circuit board PCB1, located beneath the receiving surface S (not shown) of the charging device D, there is: the NFC communication antenna A2 and the WPC charging antenna A1.

On a second carrier, which is a printed circuit board PCB2, located beneath the first carrier PCB1 (relative to the receiving surface S) and facing same, there is: the means for controlling the NFC communication antenna and the means for controlling the WPC charging antenna, as well as the UHF communication antenna A3 and the means for controlling said antenna.

The various control means for said antennas may be grouped together in a control unit M1 integrated into a microcontroller.

The control means for the NFC communication antenna located on the second printed circuit board PCB2 are connected to said NFC antenna A2 located on the first printed circuit board PCB1 by wired connections J.

Similarly, the control means for the WPC charging antenna A1 located on the second printed circuit board PCB2 are connected to said WPC antenna A1 located on the first printed circuit board PCB1 by wired connections (not shown in FIG. 1).

The UHF communication antenna A3, in the form of a "wire" antenna, is, for its part, connected to the control means M1 by at least one connection T1 located on the second carrier PCB2.

However, the integration of the UHF antenna A3 on the second PCB2 carrier presents other problems:
- specifically, since several regions on the second printed circuit board PCB2 must be free of all components in order to maintain an acceptable level of mechanical strength, the space left for the UHF antenna A3 is therefore limited, and
- the presence of power electronics in the control unit M1 requires the presence of electromagnetic shielding elements in order to meet EMC (electromagnetic compatibility) requirements, and these electromagnetic shielding elements interfere with the operation of the UHF antenna A3, located nearby, on the same plane.

The remaining space available on the second carrier PCB2 for the UHF antenna A3 is therefore often very limited. The size of the UHF antenna A3 is then small in comparison with an optimal size, which does not allow effective operation of said antenna and effective BLE communication performance. In addition, since the UHF antenna A3 is located far from the receiving surface S, the electromagnetic radiation from the UHF antenna A3 perceived by the portable apparatus, whether located on the receiving surface S or not, is greatly decreased.

SUMMARY OF THE INVENTION

It is therefore desirable to improve the performance of the UHF communication antenna A3 when said antenna is integrated into a device which does not have enough space for the integration thereof, whether it be a charging device comprising a WPC charging antenna and an NFC antenna or be a near-field-communication device that does not have enough space for the integration of a UHF antenna.

To this end, an aspect of the invention provides a device for near-field and ultra-high-frequency communication, the device comprising:
- an NFC near-field-communication antenna,
- a BLE ultra-high-frequency antenna,
- a control unit comprising control means for controlling the ultra-high-frequency antenna and control means for controlling the near-field-communication antenna,
- a first carrier on which the NFC antenna is located,
- a second carrier on which the control unit is located, the first carrier and second carrier being located one above the other and connected by mechanical support pins, the device being noteworthy in that the ultra-high-frequency antenna is located on the first carrier and is connected to the control unit via:
- a first connection located on the first carrier,
- at least one pin made of conductive metal,
- and a second connection located on the second carrier, so as to produce a bidirectional ultra-high-frequency antenna.

Judiciously, a total length of the ultra-high frequency bidirectional antenna is equal to:

$$L_{TOT} = L + H1 + Lc2 + Lc1$$

and is between:

$$L_{TOT} = \left[\frac{\lambda}{20}; \frac{\lambda}{2}\right]$$

where:
$L_{TOT}$: total length of the bidirectional antenna,
H1: height of the pin,
$\lambda$: ultra-high-frequency wavelength,
Lc1: length of the first connection,
Lc2: length of the second connection,
L: length of the ultra-high-frequency antenna.

Advantageously, the first connection and the second connection consist of vias, and the total length of the bidirectional antenna is equal to:

$$L_{TOT} = L + H1$$

H1: height of the pin,
$\lambda$: ultra-high-frequency wavelength,
L: length of the ultra-high-frequency antenna.

In one particular embodiment, the near-field-communication antenna and the ultra-high-frequency antenna are connected to the control unit by a common pin and by a first and a second common via, and the device further comprises frequency-filtering means.

In another particular embodiment, the ultra-high-frequency antenna is integrated into the near-field-communication antenna and is connected on both sides to the near-field-communication antenna by the frequency-filtering means.

The filtering means consist, for example, of an inductor and/or a capacitor.

Additionally, the first carrier and/or the second carrier consist of printed circuit boards.

An aspect of the invention also applies to any portable user apparatus, to any inductive charger for a portable user apparatus, or to any motor vehicle comprising a communication device according to any of the features presented above.

BRIEF DESCRIPTION OF THE DRAWINGS

Other aims, features and advantages of aspects of the invention will become apparent on reading the following description, provided by way of non-limiting example, and on examining the appended drawings, in which.

DETAILED DESCRIPTION OF THE PREFERRED EMBODIMENTS

The near-field and ultra-high-frequency communication device D' according to an aspect of the invention is shown in FIGS. 2A to 6.

Figure 2A:
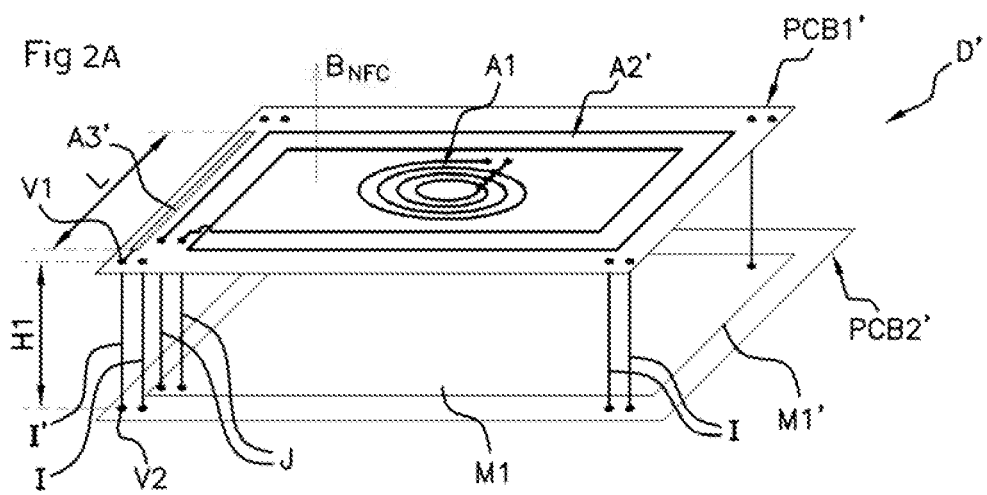
FIG. 2A shows a near-field and ultra-high-frequency communication device D' according to a first embodiment of the invention.

In FIG. 2A, the communication device D' comprises a WPC charging antenna A1, with the assumption that the communication device D' is integrated for example into an inductive charger (not shown) for a portable apparatus.

However, an aspect of the invention applies to any communication device comprising at least one near-field-communication antenna, which will be referred to as NFC antenna A2', and an ultra-high-frequency communication antenna, which will be referred to as UHF antenna A3', which is a BLE antenna, whether the communication device is integrated into an inductive charger or not, and having difficulty with integrating the UHF antenna A3' due to a lack of space.

In this case, an aspect of the invention also applies to a portable user apparatus comprising at least one near-field-communication antenna A2' and an ultra-high-frequency communication antenna.

What is understood by NFC antenna A2' is any antenna allowing near-field communication at a frequency of around 13.56 MHz.

The device D' also comprises a UHF antenna A3' transmitting at a second communication frequency, for example at the BLE (Bluetooth Low Energy®) frequency of 2.4 GHz.

In FIG. 2A, the NFC antenna A2' of the communication device D' is located on the periphery of a first carrier, for example on the periphery of a first printed circuit board PCB1'.

Also located on the first carrier PCB1', at the center thereof, is the WPC charging antenna A1.

In the example of an inductive charger, the first carrier PCB1' is located beneath the receiving surface S, on which the user places their portable apparatus in order to charge it through induction via the WPC charging antenna A1.

The device D' also comprises a second carrier, for example a second printed circuit board PCB2' located below the first printed circuit board PCB1' relative to the charging surface S, and on which there is a control unit M1' for controlling said three antennas A1, A2, A3'.

Figure 1:
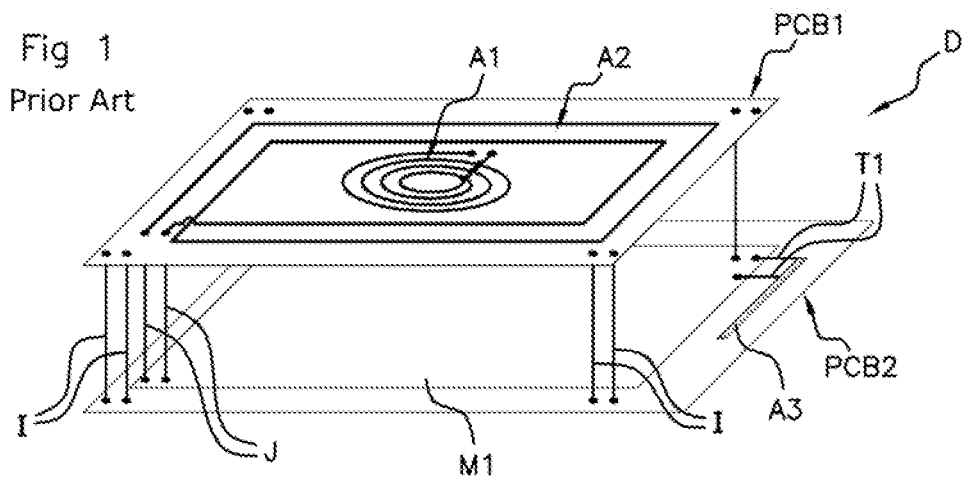
FIG. 1 shows a near-field and ultra-high-frequency communication device D according to the prior art, and described above.

The two carriers PCB1', PCB2' are located one above the other, preferably, but not exclusively, facing each other, and are connected to each other by pins I which are located, for example, and without this being limiting, at the four corners of the two said carriers PCB1', PCB2' (see FIG. 1). Said pins I allow the two carriers PCB1', PCB2' to be mutually mechanically supported and are for example plastic rods.

What is understood by control unit M1' for controlling said three antennas is for example a microcontroller further comprising:
  control means M2 for controlling the NFC antenna A2',
    further comprising:
    a data transceiver 10 at NFC frequency, connected to impedance matching means 20,
    NFC transceiving control means (not shown),
  control means M3 (not shown) for controlling the WPC inductive charging antenna A1, further comprising:
    charging control means,
    a charging data transceiver, connected to impedance-matching means,
  control means M4 for controlling the ultra-high-frequency (UHF) antenna A3', further comprising:
    an ultra-high-frequency data transceiver 30, connected to
    impedance-matching means 40,
    means for controlling BLE transceiving (not shown).

The control means M2, M3 and M4 for said three antennas A2', A1, A3' are known to those skilled in the art and will not be described in further detail here.

Preferably, said control means M2, M3, M4 are in the form of software and electronic components, held in the control unit M1', i.e. in a microcontroller.

The NFC antenna A2' and the WPC charging antenna A2 are for example respectively connected to their respective control means M2, M3 by wired connections J (see FIG. 2A).

As explained above, the integration of an additional antenna, in this case a UHF antenna A3', is difficult due to the lack of space, whether on the first or on the second carrier PCB1', PCB2'.

Unlike the prior art, an aspect of the invention proposes that the UHF antenna A3' be located on the first carrier PCB1' and said UHF antenna A3' be connected to the control means M4 (i.e. to the control unit M1') located on the second carrier PCB2' via two connections v1, v2 (see FIGS. 2A and 2B) and a pin I' made of conductive metal.

The UHF antenna A3' is therefore connected to the control unit M1' by (see FIG. 2B):
  a first connection c1 made of conductive metal, located on the first carrier PCB1', connected on one side to said UHF antenna A3' and on the other side to the pin I' made of conductive metal,
  the pin I' made of conductive metal,
  a second connection c2 made of conductive metal, located on the second carrier PCB2', connected on one side to the pin I' and on the other side to the control unit M1.

The total length $L_{TOT}$ of the arrangement consisting of the UHF antenna A3', of the first connection c1, of the pin I' and of the second connection c2 is therefore equal to:

$$L_{TOT} = L + H1 + Lc2 + Lc1$$

where:
$L_{TOT}$: total length (mm) of the arrangement,
H1: height of pin I' between the first carrier PCB1' and the second carrier PCB2' (mm),
$\lambda$: wavelength corresponding to ultra-high frequency (mm),
Lc1: length of the first connection c1 located on the first carrier PCB1' between the UHF antenna A3' and the pin I' (mm),
Lc2: length of the second connection c2 located on the second carrier PCB2' between the pin I' and the control unit M1' (mm),
L: length of the UHF antenna A3'.

According to an aspect of the invention, the total length $L_{TOT}$ of said arrangement is between:

$$L_{TOT} = \left[\frac{\lambda}{20}; \frac{\lambda}{2}\right]$$

preferably where:

$$L_{TOT} = \left[0.5 \times \frac{\lambda}{4}; 1.5 \times \frac{\lambda}{4}\right]$$

where:

λ: wavelength at BLE frequency (mm).

Thus, the arrangement comprising the first connection and the second connection c1, c2, the pin I' and the BLE UHF antenna A3', connected to one another and made of conductive metal, constitutes a bidirectional UHF antenna A30' of resonant length $L_{TOT}$, i.e. it operates at ultra high frequency and more particularly at the frequency of BLE.

Preferably, an aspect of the invention proposes that the first connection and the second connection c1, c2 be of very small length, even of zero length, for example that the first connection and the second connection c1, c2 consist only of vias v1, v2 made of conductive metal, for example copper, passing through the first printed circuit board PCB1' and the second printed circuit board PCB2', thus the above mathematical formula can be simplified:

$$L_{TOT}=L+H1$$

where:

$L_{TOT}$: total length of the bidirectional BLE antenna A30' (mm),

H1: height of pin I' between the first carrier PCB1' and the second carrier PCB2' (mm), L: length of the UHF antenna A3' (mm).

Of course, the first connection and the second connection may also be in the form of an assembly comprising a via and a printed copper wire, which are electrically conductive.

An aspect of the invention thus makes it possible, as explained below, to considerably decrease the size needed for the integration of the UHF antenna A3' on the first carrier PCB1'.

Figure 2B:
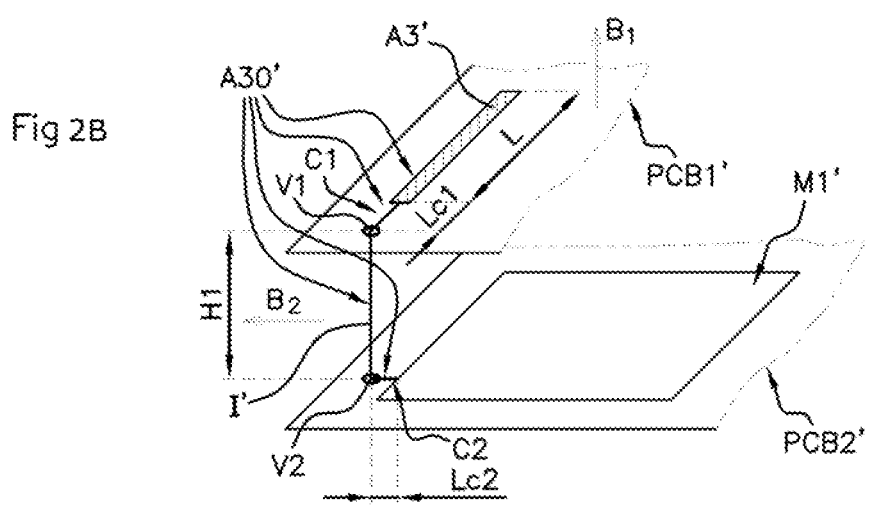
FIG. 2B shows the bidirectional UHF antenna A30' comprising a first UHF antenna portion A3', the first connection c1 on the first carrier PCB1, the pin I' and the second connection c2 on the second carrier PCB2, v

The UHF antenna A3' of length L is therefore extended by a pin I' of height H1, perpendicular to the first carrier PCB1' and thus forming a bidirectional BLE antenna A30' which emits an electromagnetic field at the same operating frequency as said UHF antenna A3' having two components, a first component B1 perpendicular to the first carrier PCB1' and a second component B2 which is parallel to the first carrier PCB1' (see FIG. 2b).

Specifically, since the pin I' connected to the UHF antenna A3' is perpendicular to the first carrier PCB1', it emits an electromagnetic field B2 perpendicular to the electromagnetic field B1 emitted by the UHF antenna A3'. The field resulting from said two perpendicular fields B1, B2 widens the ultra-high-frequency communication area and improves the effectiveness of ultra-high-frequency communication.

Ingeniously, the use of the pin I' as an extension of the UHF antenna A3' makes it possible to decrease the length of said UHF antenna A3' on the first carrier PCB1' while keeping a total length $L_{TOT}$ of the bidirectional BLE antenna A30' optimal for effective BLE communication.

Thus, even if the space allocated to the UHF antenna A3' on the first carrier PCB1' is limited, by extending the UHF antenna A3' using the pin I' it is possible to decrease the length L of the UHF antenna A3' on the first carrier PCB1'.

In addition, since the UHF antenna A3' is located on the first carrier PCB1', i.e. beneath the receiving surface S and not far away from the receiving surface S, as in the prior art, the effectiveness of UHF communication between the UHF antenna A3' and the portable apparatus, whether placed on the charging surface S or not, is improved with respect to the prior art.

Of course, the vias v1, v2 may also be supplemented by wired connections c1, c2.

Figure 3:
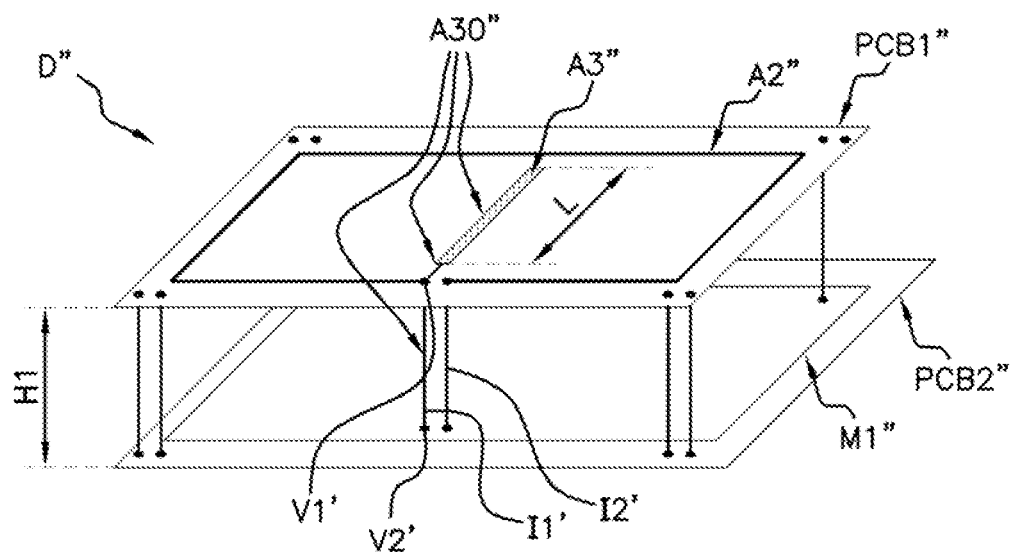
FIG. 3 shows a near-field and ultra-high-frequency communication device D" according to a second embodiment of the invention.

In a second embodiment of the device D" according to the invention and illustrated in FIG. 3, the NFC antenna A2" and the UHF antenna A3" are connected to the control unit M1" by a common pin made of conductive metal and by a first via v1' and a second via v2' that are common to the two antennas A2", A3".

Similarly and according to an aspect of the invention, the UHF antenna A3", the first via v1' located on the first carrier PBC1", the pin and the second via v2' located on the second carrier PCB2" constitute a UHF bidirectional antenna A30".

Of course, similarly, the vias v1, v2 may also be supplemented by wired connections c1, c2 (not shown in FIG. 3)

In the example illustrated in FIG. 3, the ultra-high-frequency antenna A3" is located inside the perimeter delimited by the NFC antenna A2".

This embodiment makes it possible to save on one wired connection J.

In this embodiment, since the two antennas, NFC A2" and UHF A3", are electrically connected to each other, the control unit M1" (see FIG. 5) further comprises first and second frequency-filtering means F1, F2 in order to:

prevent current from flowing into the control means M2 for the NFC antenna A2" from the control means M4 for the UHF antenna A3", prevent current from flowing into the control means M4 for the UHF antenna A3" from the second control means M2 for the NFC antenna A2".

Thus, the two antennas, NFC A2" and UHF A3", may simultaneously transmit data at their respective frequencies.

Figure 5:
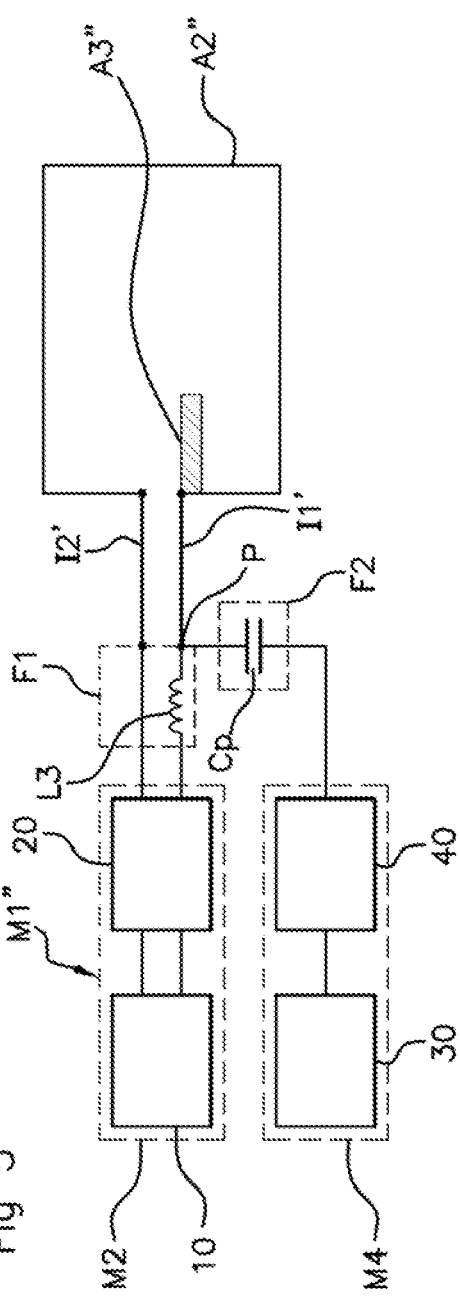

This is illustrated in FIG. 5. In FIG. 5, an NFC transceiver 10 is connected to an NFC frequency-matching circuit 20, in turn connected to the NFC antenna A2" by two pins I1' and I2' made of conductive metal.

The BLE transceiver 30 is connected to a BLE-matching circuit 40, in turn connected to said UHF antenna A3" by one of the two pins I1', common to the NFC antenna A2".

The first filtering means F1 consists of an inductor L3, connected between the control means M2 and a junction point P, connecting the control means M4 to the pin I1'.

For example L3=47 nH.

The second filtering means F2 consists of a capacitor Cp connected between the control means M4 and the junction point P.

For example Cp=10 pF.

Figure 4:
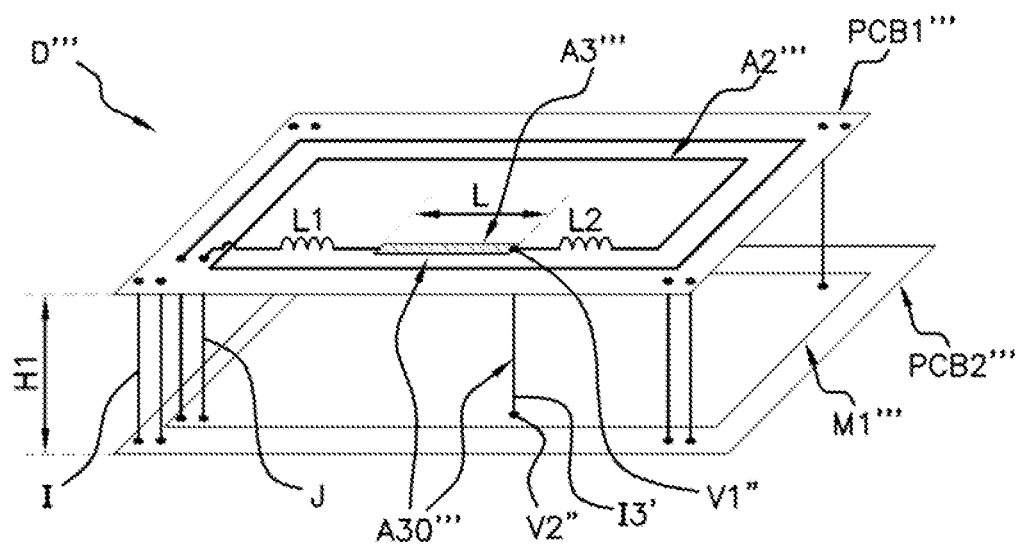
FIG. 4 shows a near-field and ultra-high-frequency communication device D''' according to a third embodiment of the invention, FIG. 5 schematically shows the control unit M1" according to the second embodiment illustrated in FIG. 3, FIG. 6 schematically shows the control unit M1''' according to the third embodiment illustrated in FIG. 6.

In a third embodiment of the charging device D'", illustrated in FIG. 4, the UHF antenna A3'" is integrated into the NFC antenna A2'". In other words, a portion of the NFC antenna A2'" is replaced with the UHF antenna A3'" and said UHF antenna A3'" is connected on both sides to the NFC antenna A2'" by third and fourth frequency-filtering means F3, F4. Said third and fourth frequency-filtering means F3, F4 consist respectively of an inductor L1 and of an LC circuit, i.e. a circuit comprising an inductor and a capacitor (see FIG. 6).

The third filtering means F3 consists of an inductor L1 connected on one side to the UHF antenna A3'" and on the other side to the control means M2 for the NFC antenna A2'".

The fourth filtering means M4 consists of an inductor L2 connected to a capacitor Cp, which are connected on one side to the control means M4 via a common pin I3' and two vias v1" and v2", which pass through the first carrier and the second carrier PCB1'" and PCB2'", and on the other side to the control means M2 for the NFC antenna A2'".

The fourth control means M4 for the UHF antenna A3'" are connected to said antenna by a pin I3' at a junction point P' located between said UHF antenna A3'" and the inductor L2.

The filtering means F3, F4 prevent parasitic currents from flowing into the control means M2 from the control means M4 and vice versa.

For example L1=L2=47 nH.

Cp=10 pF.

Similarly and according to an aspect of the invention, the UHF antenna A3''', the first via v1'' located on the first carrier PCB1''', the pin I3' and the second via v2'' located on the second carrier PCB2''' constitute a bidirectional BLE antenna A30'''.

Likewise, the filtering means F3, F4 allow the two antennas, NFC A2''', UHF A3''', to transmit simultaneously at their respective frequencies without interference.

Figure 6:
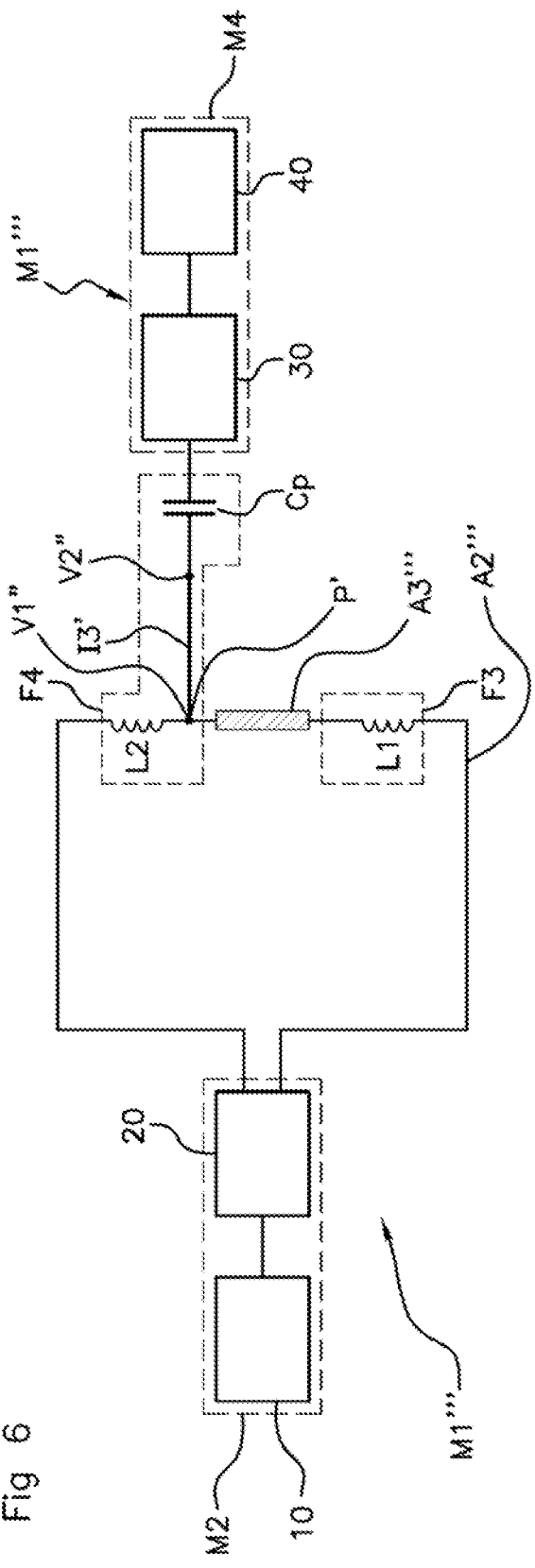

This is illustrated in FIG. 6.

This third embodiment also makes it possible to leave the space located inside the perimeter defined by the NFC antenna A3''' free and to locate there, for example, a WPC antenna A1.

In the three embodiments described according to the invention, the NFC antenna A2', A2'', A2''' and the UHF antenna A30', A30'', A30''' may simultaneously transmit data at their respective frequencies.

Of course, it is also possible to replace each filtering means F1, F2, F3, F4 with a switch. Thus, the NFC and UHF antennas may transmit data consecutively rather than simultaneously.

An aspect of the invention therefore ingeniously makes it possible not only to integrate an ultra-high-frequency antenna into a charging device already comprising a charging antenna and a near-field-communication antenna, but also to improve the effectiveness of ultra-high-frequency communication by placing the UHF antenna beneath the receiving surface, which was not possible in the prior art, and by creating a bidirectional antenna through the use of the support pins between the two carriers of the charging device.

An aspect of the invention is all the more judicious since the embodiments presented allow the antennas to transmit simultaneously, while decreasing the cost of the device, through the use of common pins and of suitable filtering means.

The invention claimed is:

1. A device for near-field and ultra-high-frequency communication, the device comprising:
   an NFC near-field-communication antenna,
   a BLE ultra-high-frequency (UHF) antenna,
   a control unit comprising control means for controlling the ultra-high-frequency antenna and control means for controlling the near-field-communication antenna,
   a first carrier on which the NFC antenna is located,
   a second carrier on which the control unit is located,
   the first carrier and second carrier being located one above the other and connected by mechanical support pins,
   wherein the BLE UHF antenna is located on the first carrier and is connected to the control unit via:
     a first connection located on the first carrier, the first connection connecting the BLE UHF antenna to a mechanical support pin of the mechanical support pins, the mechanical support pin made of conductive metal, the mechanical support pin being perpendicular to the first carrier and the second carrier, and
     a second connection located on the second carrier, the second connection connecting the mechanical support pin to the control unit,
   wherein a first connection length of the first connection, and a second connection length of the second connection, a pin length of the mechanical support pin, and an antenna length of the BLE UHF antenna are designed such that the combined structure of the BLE UHF antenna, the first connection, the mechanical support pin, and the second connection has a total length to form a bidirectional BLE UHF antenna emitting an electromagnetic field at the same operating frequency as said BLE UHF antenna and having two components, a first component perpendicular to the first carrier and a second component which is parallel to the first carrier.

2. The device as claimed claim 1, wherein a total length of the bidirectional ultra-high-frequency antenna is equal to:

$$L_{TOT}=L+H1+Lc2+Lc1$$

and is between:

$$L_{TOT} = \left[\frac{\lambda}{20}; \frac{\lambda}{2}\right]$$

where:
$L_{TOT}$: total length of the bidirectional antenna,
H1: height of the mechanical support pin,
λ: ultra-high-frequency wavelength,
Lc1: length of the first connection,
Lc2: length of the second connection,
L: length of the ultra-high-frequency antenna.

3. The device as claimed in claim 2, wherein the first connection and the second connection consist of vias, and the total length of the bidirectional antenna is equal to:

$$L_{TOT}=L+H1$$

where:
H1: height of the mechanical support pin,
λ: ultra-high-frequency wavelength,
L: length of the ultra-high-frequency antenna.

4. The device as claimed in claim 1, wherein the first connection and the second connection consist of vias, and that the total length of the bidirectional antenna is equal to:

$$L_{TOT}=L+H1$$

where:
H1: height of the mechanical support pin,
λ: ultra-high-frequency wavelength,
L: length of the ultra-high-frequency antenna.

5. The device as claimed in claim 4, wherein the ultra-high-frequency antenna is integrated into the near-field-communication antenna and is connected on both sides to the near-field-communication antenna by the frequency-filtering means.

6. The device as claimed in claim 5, wherein the filtering means comprises an inductor and/or a capacitor.

7. The device as claimed in claim 1, wherein the near-field-communication antenna, and the ultra-high-frequency antenna are connected to the control unit by a common pin, and by a first and a second common via (v1', v2') and in that the device further comprises frequency-filtering means.

8. The device as claimed in claim 7, wherein the filtering means comprises an inductor and/or a capacitor.

9. The device as claimed in claim 7, wherein the ultra-high-frequency antenna is integrated into the near-field-communication antenna and is connected on both sides to the near-field-communication antenna by the frequency-filtering means.

10. The device as claimed in claim 1, wherein the first carrier and/or the second carrier consist of printed circuit boards.

11. A portable user apparatus comprising a communication device as claimed in claim 1.

12. An inductive charger for a portable user apparatus comprising a communication device as claimed in claim 1.

13. A motor vehicle comprising a communication device as claimed in claim 1.

* * * * *

UNITED STATES PATENT AND TRADEMARK OFFICE
CERTIFICATE OF CORRECTION

PATENT NO. : 11,444,390 B2
APPLICATION NO. : 16/957175
DATED : September 13, 2022
INVENTOR(S) : Rachid Benbouhout It is certified that error appears in the above-identified patent and that said Letters Patent is hereby corrected as shown below:

On the Title Page

Item (57) Abstract, Line 10, "...pins, it is..." should read --...pins. It is...--.

Signed and Sealed this
Twentieth Day of December, 2022

Katherine Kelly Vidal
*Director of the United States Patent and Trademark Office*